United States Patent
Ohara

(10) Patent No.: US 7,379,196 B2
(45) Date of Patent: May 27, 2008

(54) PRINTING SYSTEM, PRINTING APPARATUS, PRINT DATA TRANSMITTING DEVICE, AND PROGRAM

(75) Inventor: Kiyotaka Ohara, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 941 days.

(21) Appl. No.: 10/396,580

(22) Filed: Mar. 26, 2003

(65) Prior Publication Data

US 2003/0184800 A1 Oct. 2, 2003

(30) Foreign Application Priority Data

Mar. 29, 2002 (JP) ............................. 2002-095245

(51) Int. Cl.
*G06F 3/12* (2006.01)
*G03G 15/00* (2006.01)

(52) U.S. Cl. ...................... 358/1.13; 358/1.9; 358/504; 358/406; 399/24; 399/25; 399/27

(58) Field of Classification Search ................ 358/1.9, 358/1.13, 1.16; 399/24–30
See application file for complete search history.

(56) References Cited

U.S. PATENT DOCUMENTS

| | | | |
|---|---|---|---|
| 6,028,676 A | 2/2000 | Nakao | |
| 6,348,971 B2* | 2/2002 | Owa et al. | 358/1.15 |
| 6,421,135 B1* | 7/2002 | Fresk et al. | 358/1.15 |
| 6,791,704 B1* | 9/2004 | Moreau et al. | 358/1.15 |
| 7,172,260 B2* | 2/2007 | Yoshida et al. | 347/7 |

FOREIGN PATENT DOCUMENTS

| | | |
|---|---|---|
| EP | 0 651 317 A2 | 5/1995 |
| JP | 1-314184 A | 12/1989 |
| JP | A 07-160443 | 6/1995 |
| JP | 8-39901 A | 2/1996 |
| JP | 9-295432 A | 11/1997 |
| JP | A 10-181163 | 7/1998 |
| JP | A 11-191054 | 7/1999 |
| JP | 2000-39980 A | 2/2000 |
| JP | 3059615 B2 | 4/2000 |
| JP | 3175911 B2 | 4/2001 |
| JP | 2002-157094 A | 5/2002 |

* cited by examiner

*Primary Examiner*—Douglas Q. Tran
*Assistant Examiner*—Chan S. Park
(74) *Attorney, Agent, or Firm*—Oliff & Berridge, PLC

(57) ABSTRACT

In a printing system, before transmitting print data to a printer, a personal computer transmits a virtual printing start command to the printer. When the data received by the printer is a virtual printing start command, the printer performs a virtual printing operation until the printer receives a virtual printing end command from the personal computer. At the virtual printing operation, procedures are similar to those of an actual printing operation. However, at the virtual printing operation, sheets are not conveyed nor is a developing agent, such as ink and toner, adhered to the sheets by a printing unit. For example, the received print data is developed into a memory as an image data. When an error occurs during the virtual printing operation, the printer provides error information to the personal computer. Then, the personal computer displays the error information via a dialog box to a user.

26 Claims, 14 Drawing Sheets

FIG.7A

WHEN VIRTUAL PRINTING CANNOT BE NORMALLY COMPLETED

| PERSONAL COMPUTER | PRINTER |
|---|---|

INTERRUPT PROHIBITION START COMMAND →

VIRTUAL PRINTING START COMMAND →

PRINT DATA (VIRTUAL PRINTING) →

PRINT DATA (VIRTUAL PRINTING) →   MEMORY FULL ERROR OCCURS AT PAGE 10.

← MEMFULL AT PAGE 10

FIG.8A

WHEN VIRTUAL PRINTING CAN BE NORMALLY COMPLETED

| PERSONAL COMPUTER | PRINTER |
|---|---|

PERSONAL COMPUTER → PRINTER: INTERRUPT PROHIBITION START COMMAND

PERSONAL COMPUTER → PRINTER: VIRTUAL PRINTING START COMMAND

PERSONAL COMPUTER → PRINTER: PRINT DATA (VIRTUAL PRINTING)

PERSONAL COMPUTER → PRINTER: PRINT DATA (VIRTUAL PRINTING)

PERSONAL COMPUTER → PRINTER: PRINT DATA (VIRTUAL PRINTING)

PERSONAL COMPUTER → PRINTER: VIRTUAL PRINTING END COMMAND

PRINTER → PERSONAL COMPUTER: OK

PRINTING SYSTEM, PRINTING APPARATUS, PRINT DATA TRANSMITTING DEVICE, AND PROGRAM

BACKGROUND OF THE INVENTION

1. Field of Invention

The invention relates to a printing system and a printing apparatus that perform a virtual printing operation based on print data.

2. Description of Related Art

There has been a printing apparatus, such as a printer, that performs printing onto a recording medium, based on print data received from a print data transmitting device, such as a personal computer. For the printing operation, the printing apparatus conveys a predetermined recording medium, such as sheets, by a sheet conveying mechanism, and applies a developing agent, such as ink or toner (black or a plurality of colors), onto the recording medium. The printing apparatus has a function of transmitting error information to the print data transmitting device in the case where an error occurs in the process of printing when being performed according to the received print data. When receiving the error information from the printing apparatus, the print data transmitting device performs processing for informing a user of the occurrence of the error during the printing operation, based on the error information.

For example, there may be a case where the printing apparatus becomes unable to store additional print data into memory. When such happens, the printing apparatus transmits a memory full error to the print data transmitting device. Then, the print data transmitting device displays a message, to the effect that a memory full error has occurred in the printing apparatus, on a display connected to the print data transmitting device, and/or transmits information of the occurrence of the memory full error to a user terminal connected to the print data transmitting device. Likewise, when the printing apparatus runs out of recording medium during the printing operation, the printing apparatus transmits a recording medium empty error and the print data transmitting device performs processing for informing the user of the lack of recording medium. As described above, the user becomes aware of the error that occurred in the printing apparatus during the printing operation on the recording medium.

However, there may be a case where the user is informed of the error while the sheet conveying mechanism is driven and a developing agent is adhered to the recording medium. In this case, the recording medium, to which the developing agent has been adhered before the error occurs, will be wasted.

It is assumed that, in a printing apparatus that prints print data by storing the print data in the memory by page, a memory full error occurs during attempted storage of print data of greater than a page in the memory. In this case, the printing of a page, during which the memory full error occurs, cannot be performed unless the memory of the printing apparatus is increased. Therefore, when this case happens, the user transmits the rest of the print data, which has not been printed, to another printing apparatus, which has sufficient free memory space, to print the print data.

When the page, at which the error occurs, and the rest of pages are printed by the other printing apparatus, consistency in a print result through the document is lost because the shape of fonts and objects, colors, and color density vary among the printing apparatuses. Therefore, in order to maintain print consistency, all of the pages of the document need to be printed again by a printing apparatus having sufficient memory space.

Especially, when the memory full error occurs while the last part (near the last page) of the print data is being stored, a plurality of sheets have already been produced containing the first part on the print data thereon. Therefore, if all of the print data is printed again by the other printing apparatus, the sheets, which have been already printed by the original printing apparatus with the print data, will be wasted.

The above situation may happen not only in a case where the memory full error occurs. There are other cases, for example, where print data cannot be interpreted due to a disparity in the printing program (emulation), where the printing apparatus runs out of recording medium of a desired size, where the number of sheets of recording medium remaining in the printer become low, and where the rest of print data is printed at lower resolution when it is determined that the memory is nearly full. The above situation also happens in a case where a buffer of an adhering unit overflows with data because print data is stored one after another in the buffer of the adhering unit even though the adhering unit has not yet outputted the print data (the buffer overruns), and in a case where the transmission of the developed print data to the adhering unit cannot be synchronized.

SUMMARY OF THE INVENTION

The invention provides a printing method, a printing system and a printing apparatus that inform a user whether processing of print data will be normally completed before an actual printing operation for the print data is performed.

According to one aspect of the invention, a printing system includes a print data transmitting unit that transmits print data, a print data receiving unit that receives the print data transmitted from the print data transmitting unit, a color applying unit that adheres a developing agent onto a recording medium in monochrome or a plurality of colors, an actual printing unit that performs an actual printing operation, in which the developing agent is adhered onto the recording medium, by at least interpreting the print data received by the print data receiving unit, conveying the recording medium by driving a conveying mechanism and providing a result of the interpretation of the print data to the color applying unit, a virtual print request transmitting unit that transmits a virtual print request for implementation of a virtual printing operation which performs operations similar to the actual printing operation but does not convey the recording medium by driving the conveying mechanism, a virtual print request receiving unit that receives the virtual print request transmitted from the virtual print request transmitting unit, a virtual printing unit that performs the virtual printing operation in accordance with the print data received by the print data receiving unit when the virtual print request receiving unit receives the virtual print request, and a virtual print result output unit that outputs a virtual print result which shows a result whether the virtual printing operation of the print data received by the print data receiving unit has been normally completed.

According to the printing system of the invention, the virtual printing operation is performed before the actual printing operation is performed, and the virtual print result, which shows whether the virtual printing operation has been normally completed, is outputted. Therefore, the user can determine in advance of actual printing whether processing of desired print data, other than a sheet conveying processing, can be normally performed.

For example, it is designed such that the virtual print result includes error information, so that the user can know what kind of errors occurred during the virtual processing of the print data. It is preferable that the error information includes what kind of errors (e.g., memory full error, sheet empty error, size mismatch error) occurred and in which page during the virtual printing operation the error occurred. In particular, it is preferable that an error, which is difficult for the user to resolve, be included in the virtual print result, as the error information. For example, when an internal error owing to internal factors of the printing operation will occur, the error information including such information, is preferably included in the virtual print result. Such an error occurs when resources become insufficient.

BRIEF DESCRIPTION OF THE DRAWINGS

An embodiment of the invention will be described in detail with reference to the following figures, wherein:

FIG. 7A is a diagram showing data communications between the personal computer and the printer when the virtual printing operation is not normally completed;

FIG. 8A is a diagram showing data communications between the personal computer and the printer when the virtual printing operation is normally completed;

DETAILED DESCRIPTION OF PREFERRED EMBODIMENTS

Figure 1:
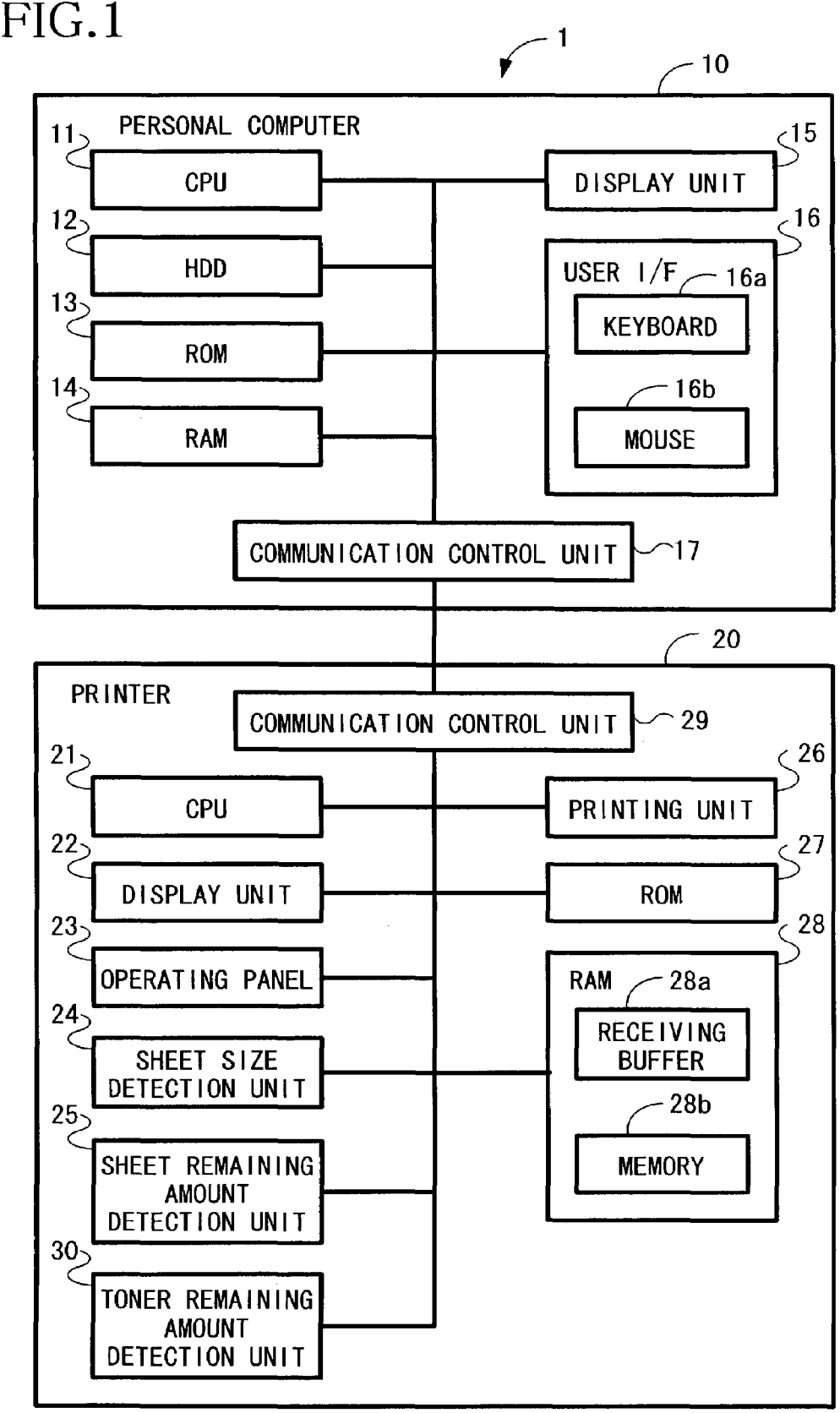
FIG. 1 is a block diagram showing the structure of a printing system of one embodiment.

An embodiment, to which the invention is applied, will be described below with reference to the accompanying drawings. As shown in FIG. 1, a printing system 1 includes a personal computer 10, as a print data transmitting device, and a printer 20, as a printing apparatus.

The personal computer 10 is a general personal computer, which includes a hard disk drive (HDD) 12, a ROM 13, a RAM 14, a display unit 15, such as a CRT, LCD or plasma display, a user interface (I/F) 16 that includes a keyboard 16a and a mouse 16b, a communication control unit 17 that controls communication with the printer 20, and a CPU 11 that controls the above-described units. The HDD 12 and the ROM 13 store various programs and data. The RAM 14 loads the data and/or programs necessary to perform operations from the HDD 12 and/or the ROM 13 and temporarily stores data therein. The CPU 11 reads an operating system from the HDD 12 into the RAM 14 to execute various application programs. The operating system includes a printer driver that converts data of a document, which is created by the application program, into various commands and/or data, which are interpretable by the printer 20, and transmits the converted data to the printer 20, in response to a request from the application program. The printer driver initially stores created print data in the HDD 12 and then reads the stored print data from the HDD 12 to transmit the print data to the printer 20.

The printer 20 includes a display unit 22, an operating panel 23 that has a plurality of switches and buttons, a sheet size detection unit 24, such as a sensor, that detects a size of a sheet, a sheet remaining amount detection unit 25, a printing unit 26 that performs printing onto a sheet, a ROM 27, a RAM 28 that temporarily stores data, a toner remaining amount detection unit 30, such as a sensor, that detects an amount of remaining toner, and a CPU 21 that controls the above-described units. The display unit 22 includes a liquid crystal display that can display, for example, a status of the printer 20. The sheet remaining amount detection unit 25 includes a sensor that detects an amount of remaining sheets of recording medium (hereinafter "sheets") in the printer 20. The printing unit 26 drives a sheet conveying motor, a laser emitting unit, a print head and an actuator to convey sheets and perform printing by adhering a developing agent, such as ink toner, to the sheets. The ROM 27 stores data and programs required for performing various operations to be executed by the CPU 21. The RAM 28 can allocate storage areas, such as a receiving buffer 28a that stores commands and print data received by the communication control unit 29 from the communication control unit 17 of the computer 10, and a memory 28b that interprets the received print data, creates image data by page and stores the image data therein.

A printing operation performed in the printing system 1 will be described below. First, a printing operation performed by the computer 10 will be described with reference to FIGS. 2A and 2B, and then, a printing operation performed by the printer 20 will be described with reference to FIGS. 4A to 6. At both of the printing operations, a virtual printing operation, which is similar to an actual printing operation but does not convey sheets, is performed before an actual printing operation, in which printing is performed onto actual sheets. FIGS. 7A and 8A show an example of communication of data and commands between the computer 10 and the printer 20 during the virtual printing operation. FIG. 9 shows an example of communication of data and commands between the computer 10 and the printer 20 during the actual printing operation. The virtual and actual printing operations will be described later with reference to FIGS. 7A to 9. FIG. 7A shows an example of the communication when the virtual printing operation is not normally completed. FIG. 8A shows an example of the communication when the virtual printing operation is normally completed.

Figure 2A:
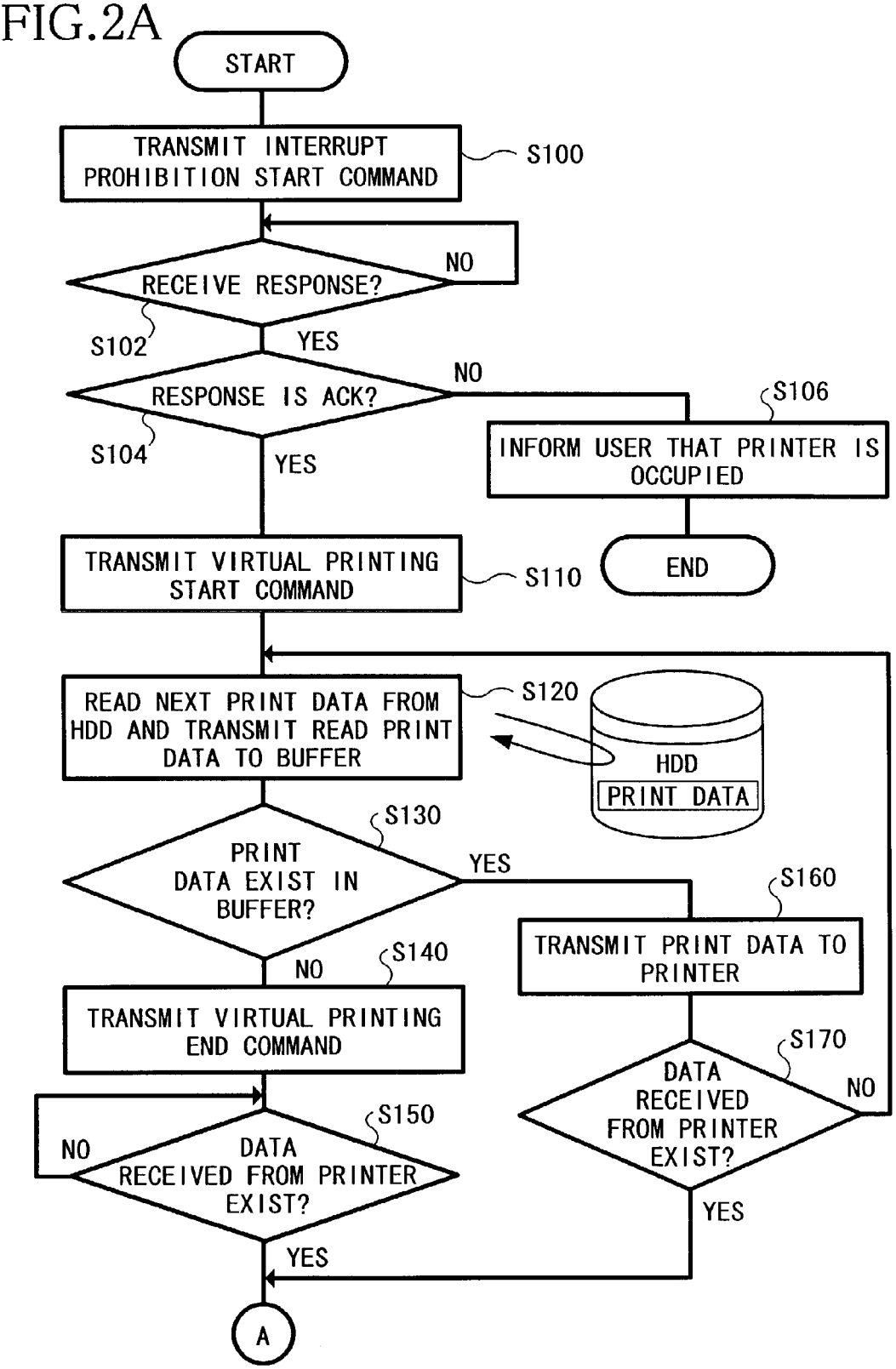
FIG. 2A is a flowchart of a printing operation to be performed by a personal computer.
Figure 2B:
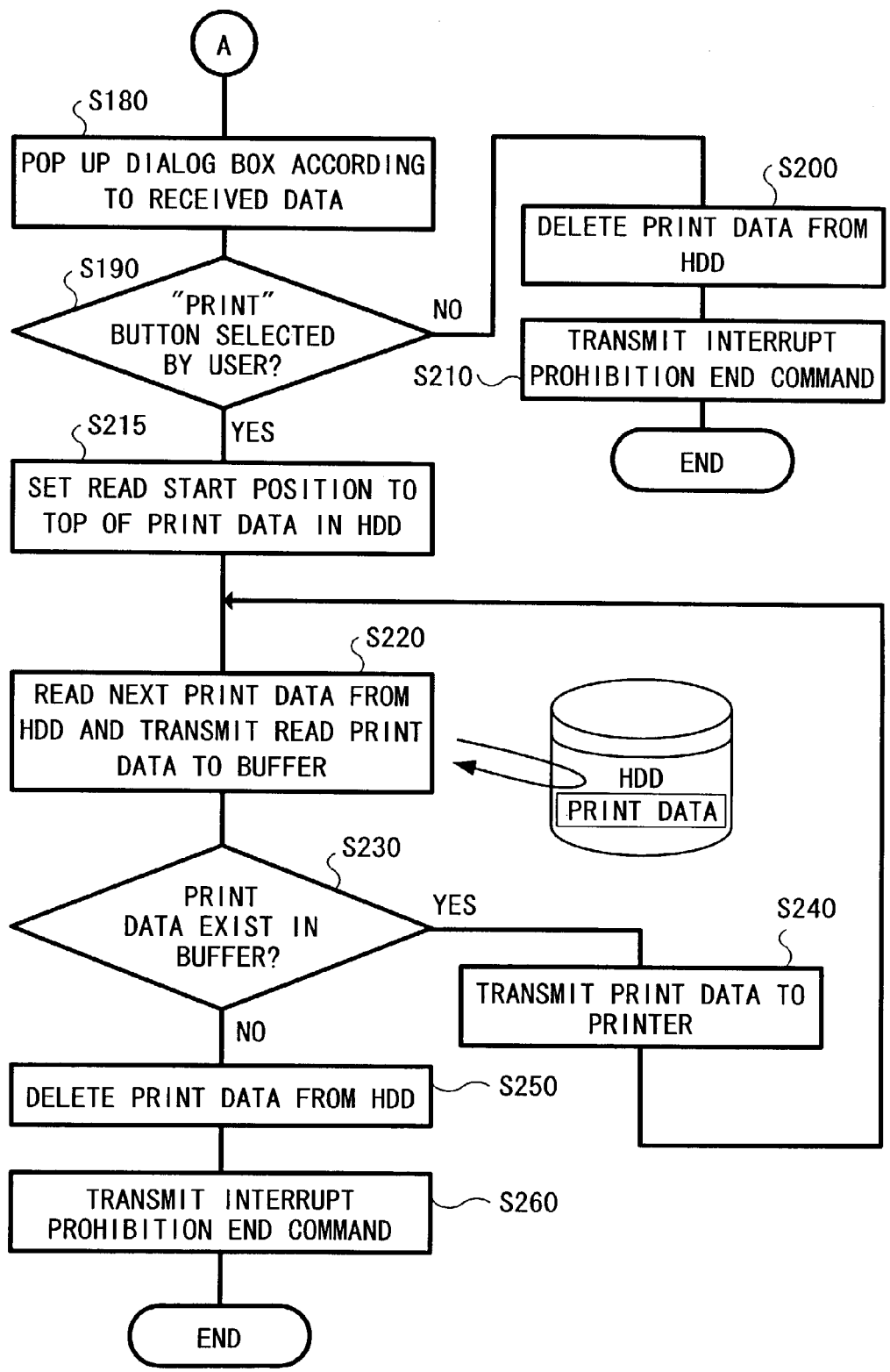
FIG. 2B is a continuation of the flowchart of FIG. 2A.

FIGS. 2A and 2B are flowcharts of the printing operation, to be executed, by which the CPU 11 drives the printer driver loaded into the RAM 14 of the computer 10. The printing operation is performed by the computer 10 to allow the printer 20 to perform the actual printing operation when a user instructs execution of the actual printing operation after a virtual printing operation for the print data stored in the HDD 12 is performed by the printer 20 and a virtual print result is provided for the user. As a printing operation of certain print data is executed, a printing operation for other print data, which is requested from the program application in the computer 10, is prohibited.

Figure 3:
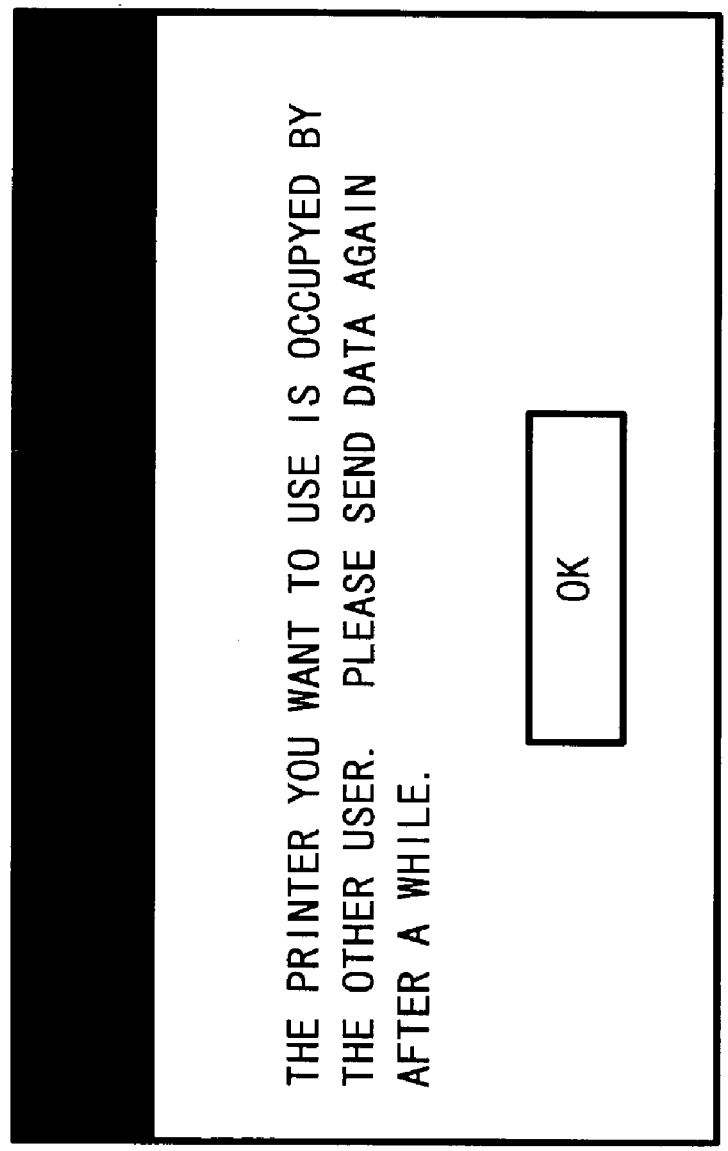
FIG. 3 is an example of a dialog box, when a printer is occupied by print data, when a virtual printing operation is requested.

At step 100 (hereinafter, S stands for step) of FIG. 2A, the computer 10 transmits an interrupt prohibition start command to the printer 20, as shown in FIGS. 7A and 8A. At S102, it is determined whether a response has been received from the printer 20. The processing of S102 is repeatedly performed until a response is received. When it is determined that a response has been received (S102:YES), flow moves to S104. At S104, it is determined whether the received response is ACK (acknowledgement). When the received response is not ACK (S104:NO), flow moves to S106 to inform the user that the printer 20 is occupied by another computer. At S106, as shown in FIG. 3, the computer 10 displays a dialog box, which shows a message such as "The printer you want to use is occupied by the other user. Please send data again after a while.", on the display unit 15. Then, the printing operation is finished. When it is determined that the received response is ACK (S104:YES), flow moves to S110.

At S110, the computer 10 transmits a virtual printing start command to the printer 20, as shown in FIGS. 7A and 8A. Then, at S120, (next) print data is read from the HDD 12 and transmitted to a buffer in the RAM 14.

Next, at S130, it is determined whether there is print data in the buffer in the RAM 14. When there is print data in the buffer (S130:YES), flow moves to S160. At S160, the print data stored in the buffer at S120 is transmitted to the printer 20. As shown in FIGS. 7A and 8A, the print data is indicated as "print data (virtual printing)". Then, at S170, it is determined whether there is data received from the printer 20. When there is data received from the printer 20 (S170:YES), flow moves to S180. When there is no data received from the printer 20 (S170:NO), flow goes back to S120. For example, when the computer 10 receives information data of an error, which occurred during the virtual printing operation in the printer 20, it is determined that there is data received from the printer 20 at S170. As shown in FIG. 7A, in a case where a memory full error occurs at page 10 at the virtual printing operation in the printer 20, the computer 10 receives data of error information, for example, "MEMFULL AT PAGE 10" as a virtual print result from the printer 20.

At S130, when it is determined that there is no print data in the buffer in the RAM 14 (S130:NO), that is, when the transmission of all of the print data stored in the buffer has been completed, flow moves to S140 to transmit a virtual printing end command to the printer 20, as shown in FIG. 8A. Then, at S150, it is determined whether data is received from the printer 20. The processing of S150 is repeatedly performed until the computer 10 receives data from the printer 20. When it is determined that data is received from the printer 20 (S150:YES), flow moves to S180. That is, as shown in FIG. 8A, when the computer 10 receives data of "OK" from the printer 20 as the virtual print result, flow moves to S180 of FIG. 2B. At S180, a dialog box pops up on the display unit 15 in accordance with the contents of the received data.

For example, when it is determined that there is data received from the printer 20 at S170 (S170:YES) and flow moves to S180, that is, there is data of error information indicating "MEMFULL AT PAGE 10" as the virtual print result, as shown in FIG. 7A, the received data is analyzed and then a message is displayed on the display unit 15. Various messages, corresponding to error information, are prestored in the printer driver. If the computer 10 has received a page number, at which the error occurred, the page number is also displayed with the message. For example, when the computer 10 receives error information of "MEMFULL AT PAGE 10" as shown in FIG. 7A, a dialog box, showing a message, such as "A memory full error will occur at page 10 and the following pages will not be printed. Do you still want to print this data?", is displayed on the display unit 15.

Figure 7B:
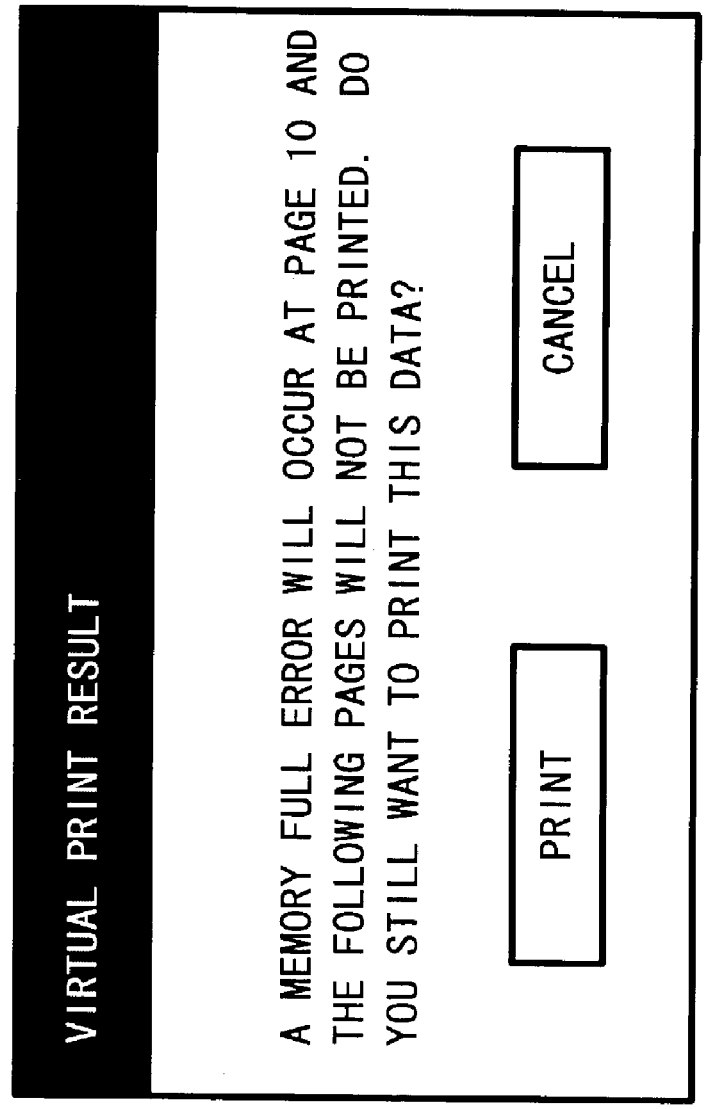
FIG. 7B is an explanatory diagram showing an example of a dialog box when the virtual printing operation is not normally completed.
Figure 8B:
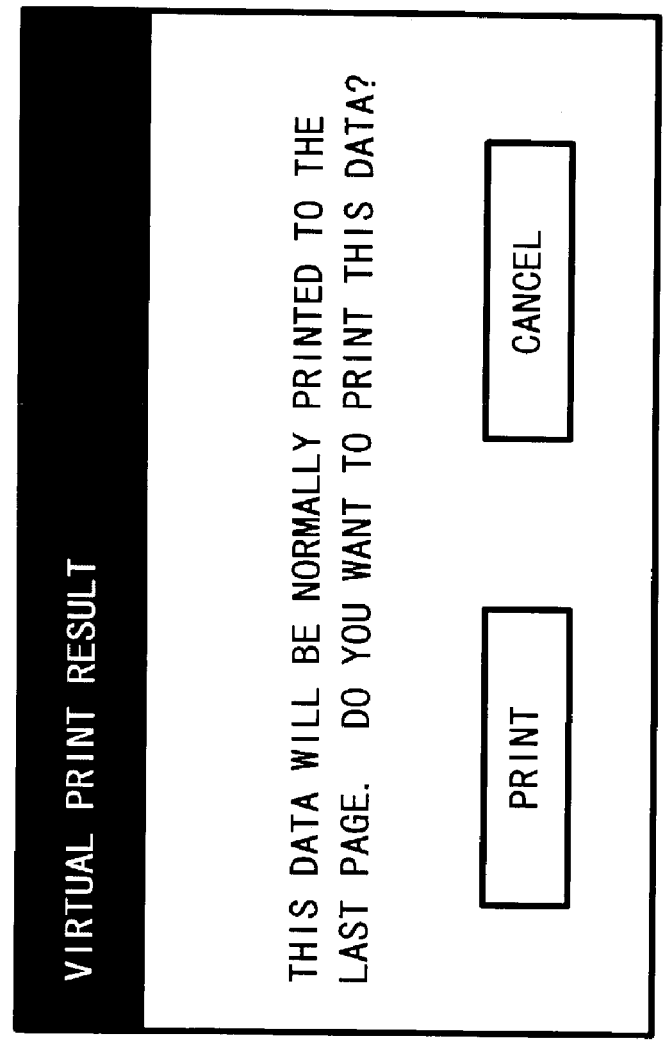
FIG. 8B is an explanatory diagram showing an example of a dialog box when the virtual printing operation is normally completed.
Figure 9:
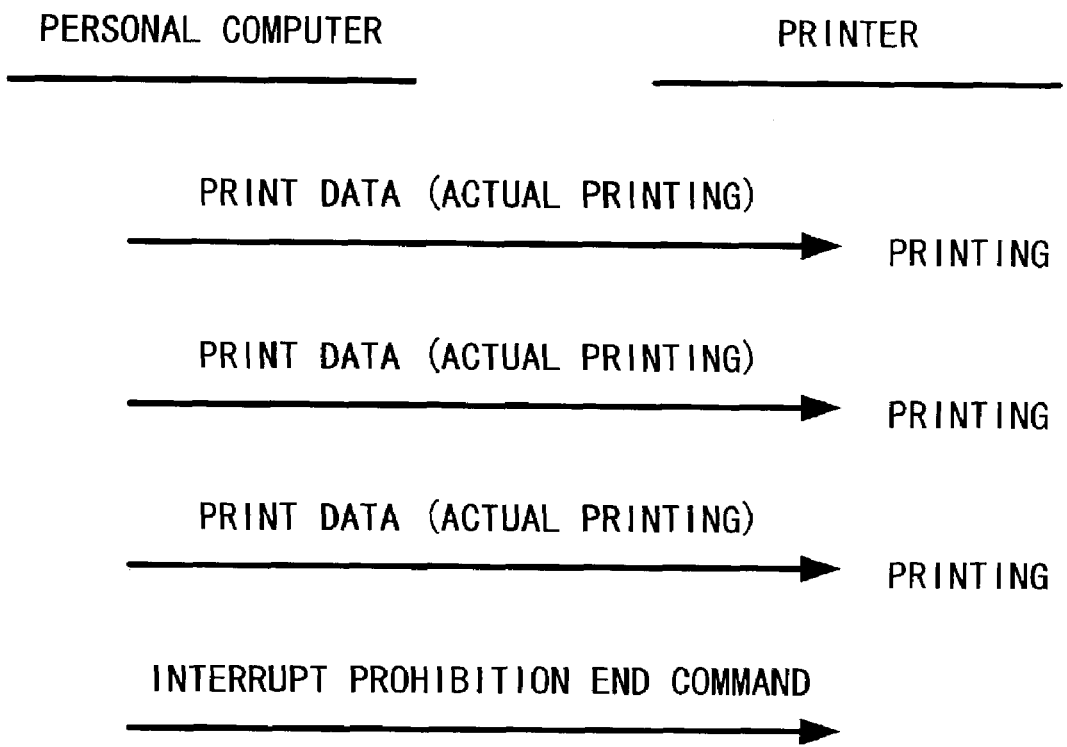
FIG. 9 is a diagram showing data communications between the personal computer and the printer when a user selects a "print" button.

When the virtual printing operation is normally completed and, thus, the computer 10 receives data of "OK" from the printer 20 as a virtual print result (S150:YES) as shown in FIG. 8A, at S 180, a dialog box, which shows a message, such as "This data will be normally printed to the last page. Do you want to print this data?", is displayed on the display unit 15. The dialog box, which pops up at S180, includes a "print" button and a "cancel" button, as shown in FIGS. 7B and 8B.

At S190 of FIG. 2B, an operation performed by the user via the user interface 16 is detected to determine which of the "print" button and the "cancel" button has been selected in the dialog box displayed on the display unit 15.

When the "cancel" button has been selected (S190:NO), flow moves to S200 to delete the print data stored in the HDD 12. After that, at S210, the interrupt prohibition end command is transmitted to the printer 20. Then, the processing is finished.

When the "print" button has been selected (S190:YES), flow moves to S215. At S215, a read start position is set to the top of the print data stored in HDD 12, and then, flow moves to S220. At S220, print data is read from the HDD 12 and then transmitted to the buffer in the RAM 14 again. Then, at S230, it is determined whether there is print data in the buffer in the RAM 14. When there is print data in the buffer (S230:YES), flow moves to S240. At S240, the print data stored in the buffer at S220 is transmitted to the printer 20, and then, flow goes back to S220. As shown in FIG. 9, the print data stored in the buffer in the RAM 14 is transmitted by a unit of data read at S220. When there is no print data in the buffer in the RAM 14 (S230:NO), that is, when the transmission of all of the print data stored in the buffer has been completed, flow moves to S250 to delete the print data from the HDD 12. After that, as shown in FIG. 9, the interrupt prohibition end command is transmitted to the printer 20 at S260. The processing is finished.

Next, the printing operation to be performed by the printer 20 will be described with reference to FIGS. 4A to 6. The printing operation is performed by which the CPU 21 executes a program stored in the ROM 27 of the printer 20. In parallel with this printing operation, the CPU 21 executes data receiving processing, in which commands and/or print data received by the communication control unit 29 from the computer 10 are transferred to the receiving buffer 28a, by multitasking processing. The data receiving processing corresponds to processing performed by a virtual print request receiving unit and print data receiving unit. In the printing operation of FIGS. 4A to 6, the CPU 21 executes the virtual printing operation and the actual printing operation by analyzing the commands and print data with reference to data stored in the receiving buffer 28a by the data receiving processing.

Figure 4A:
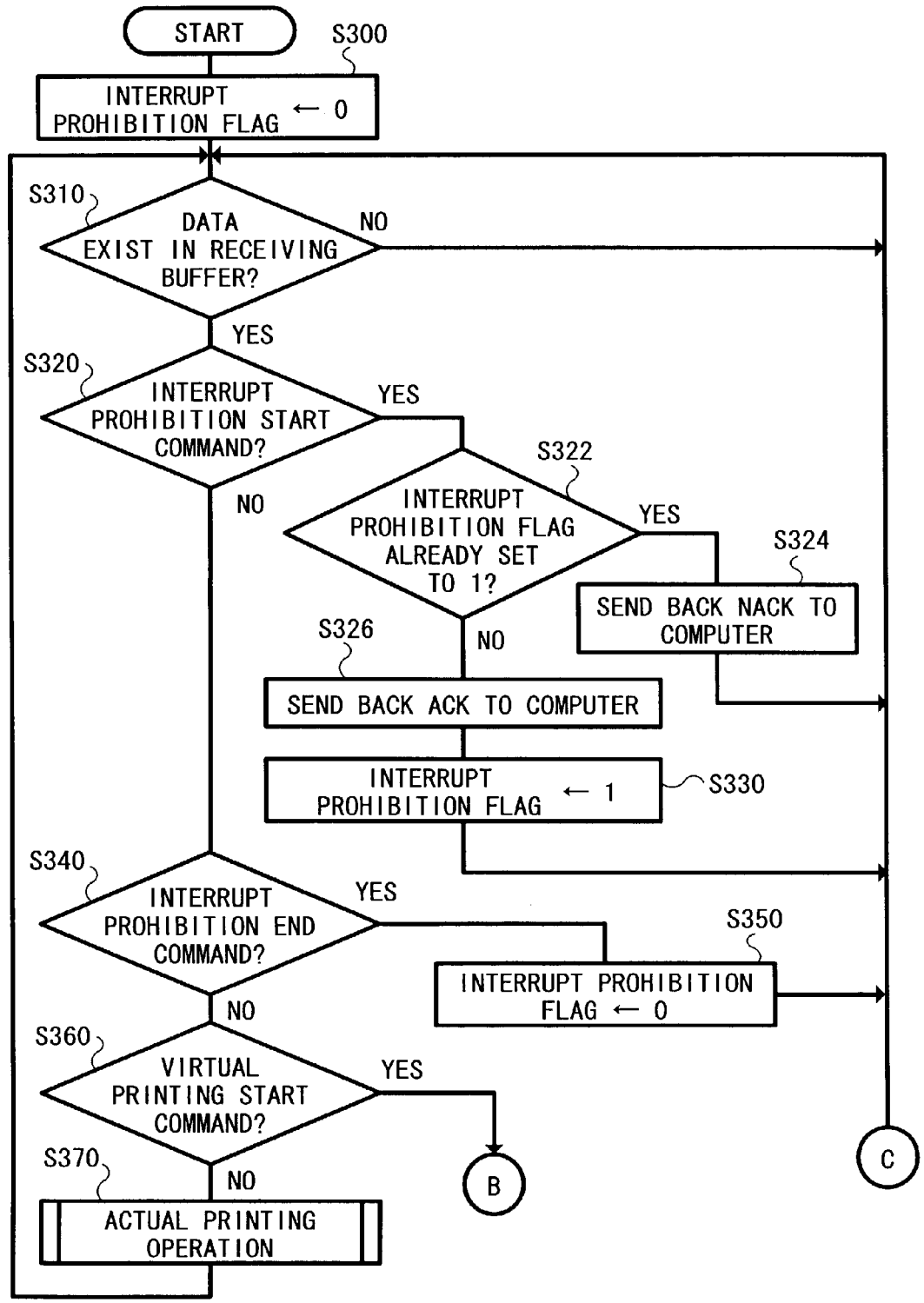
FIG. 4A is a flowchart of a printing operation to be performed by the printer.

As shown in FIG. 4A, first, at S300, an interrupt prohibition flag of the communication control unit 29 is set to 0. In this state, the communication control unit 29 accepts all commands and print data from any computers connected with the communication unit 29. When 1 is set to the interrupt prohibition flag, the communication control unit 29 only accepts commands and print data from the computer which has transmitted the interrupt prohibition start command to the printer 20, and rejects interrupts from the other computers.

At S310, it is determined whether there is data to be processed in the receiving buffer 28*a*. When there is no data to be processed (S310:NO), flow goes back to S310. That is, the processing of S310 is repeatedly performed until the receiving buffer 28*a* receives data to be processed. On the other hand, when there is data to be processed in the receiving buffer 28*a* (S310:YES), flow moves to S320.

At S320, it is determined whether data to be processed in the receiving buffer 28*a* is an interrupt prohibition start command. When the data is an interrupt prohibition start command (S320:YES), flow moves to S322. At S322, it is determined whether the interrupt prohibition flag has been set to 1. When the interrupt prohibition flag has been already set to 1 (S322:YES), flow moves to S324 to send back NACK (negative acknowledgement) to the computer 10 and then returns to S310. At S322, when the interrupt prohibition flag is not 1, that is, 0 (S322:NO), flow moves to S326 to send back ACK (acknowledgement) to the computer 10. Then, at S330, the interrupt prohibition flag is set to 1, so that the printer 20 enters the interrupt prohibition state. After that, flow goes back to S310. When it is determined that the data in the receiving buffer 28*a* is not an interrupt prohibition start command (S320:NO), flow moves to S340.

At S340, it is determined whether the data to be processed in the receiving buffer 28*a* is an interrupt prohibition end command. When the data is an interrupt prohibition end command (S340:YES), flow moves to S350 to set the interrupt prohibition flag to 0. Thus, the printer 20 exits the interrupt prohibition state. Then, flow returns to S310. When the data in the receiving buffer 28*a* is not an interrupt prohibition end command (S340:NO), flow moves to S360.

At S360, it is determined whether the data to be processed in the receiving buffer 28*a* is a virtual printing start command. When the data in the receiving buffer 28*a* is not a virtual printing start command (S360:NO), flow moves to S370. At S370, an actual printing operation (normal printing operation) is performed, and then flow returns to S310. When the data in the receiving buffer 28*a* is a virtual printing start command (S360:YES), a next waiting data is regarded as data to be processed and then flow moves to S380.

At S380, virtual printing initialization is performed. FIG. 5 shows in detail the procedures of virtual printing initialization. At S500 of FIG. 5, the actual number of remaining sheets, which is detected by the sheet remaining amount detection unit 25, is set as a virtual number of remaining sheets. Then, at S510, the virtual number of used sheets is set to 0. After that, at S520, an actual amount of remaining toner is set as a virtual amount of remaining toner. Flow then moves to S390 of FIG. 4.

At S390, it is determined whether there is data to be processed in the receiving buffer 28*a*. When there is no data to be processed (S390:NO), flow returns to S390. That is, the processing of S390 is repeatedly performed until data to be processed is present in the receiving buffer 28*a*. When there is data to be processed (S390:YES), flow moves to S400.

At S400, it is determined whether the data to be processed in the receiving buffer 28*a* is a virtual printing end command. When the data is a virtual printing end command (S400:YES), flow moves to S410. At S410, data of "OK" as a virtual print result is transmitted to the computer 10 that has transmitted the print data to the printer 20, as shown in FIG. 8A. After that, flow goes back to S310.

Figure 6A:
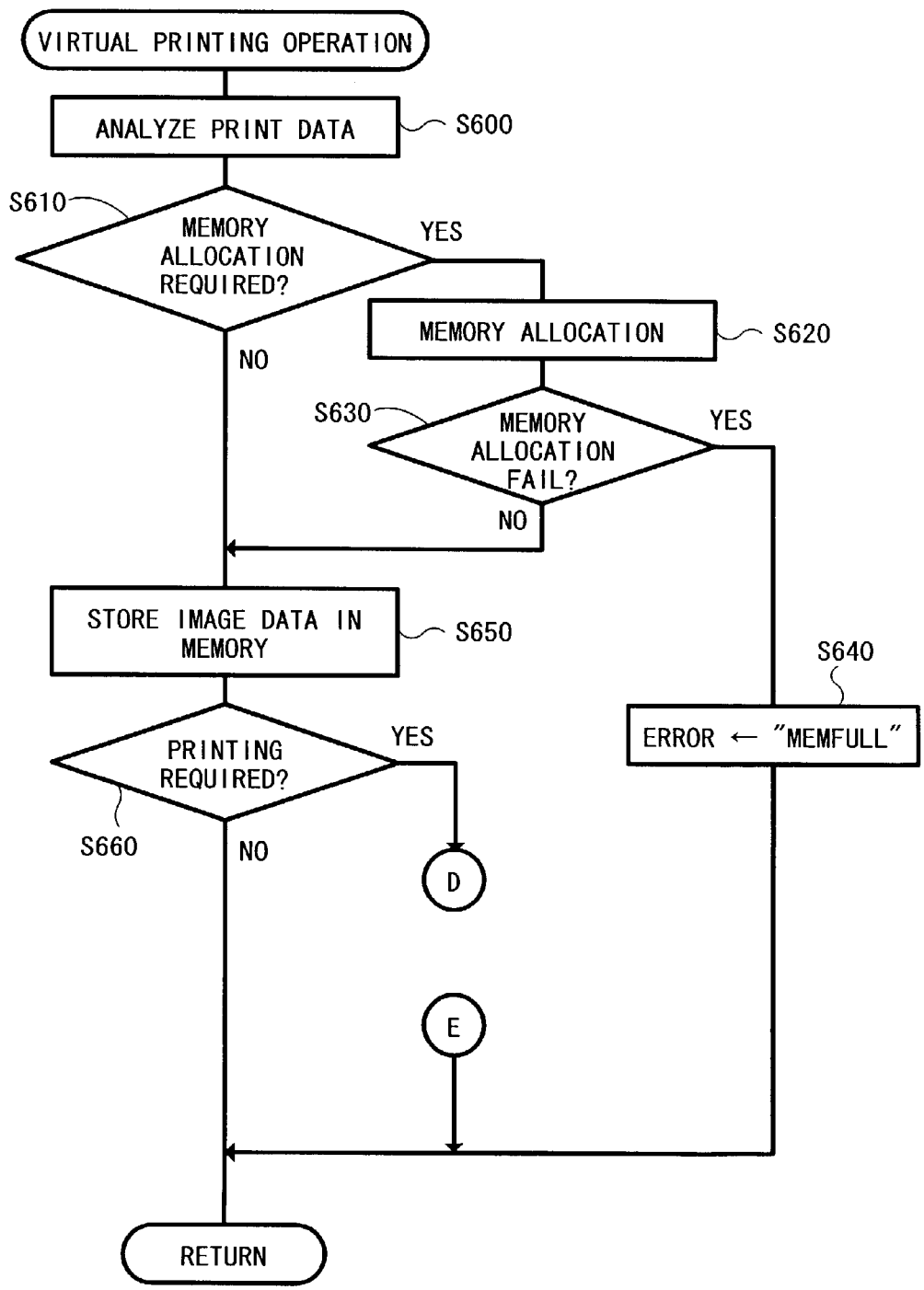
FIG. 6A is a flowchart showing detailed procedures of the virtual printing operation of FIG. 4A.
Figure 6B:
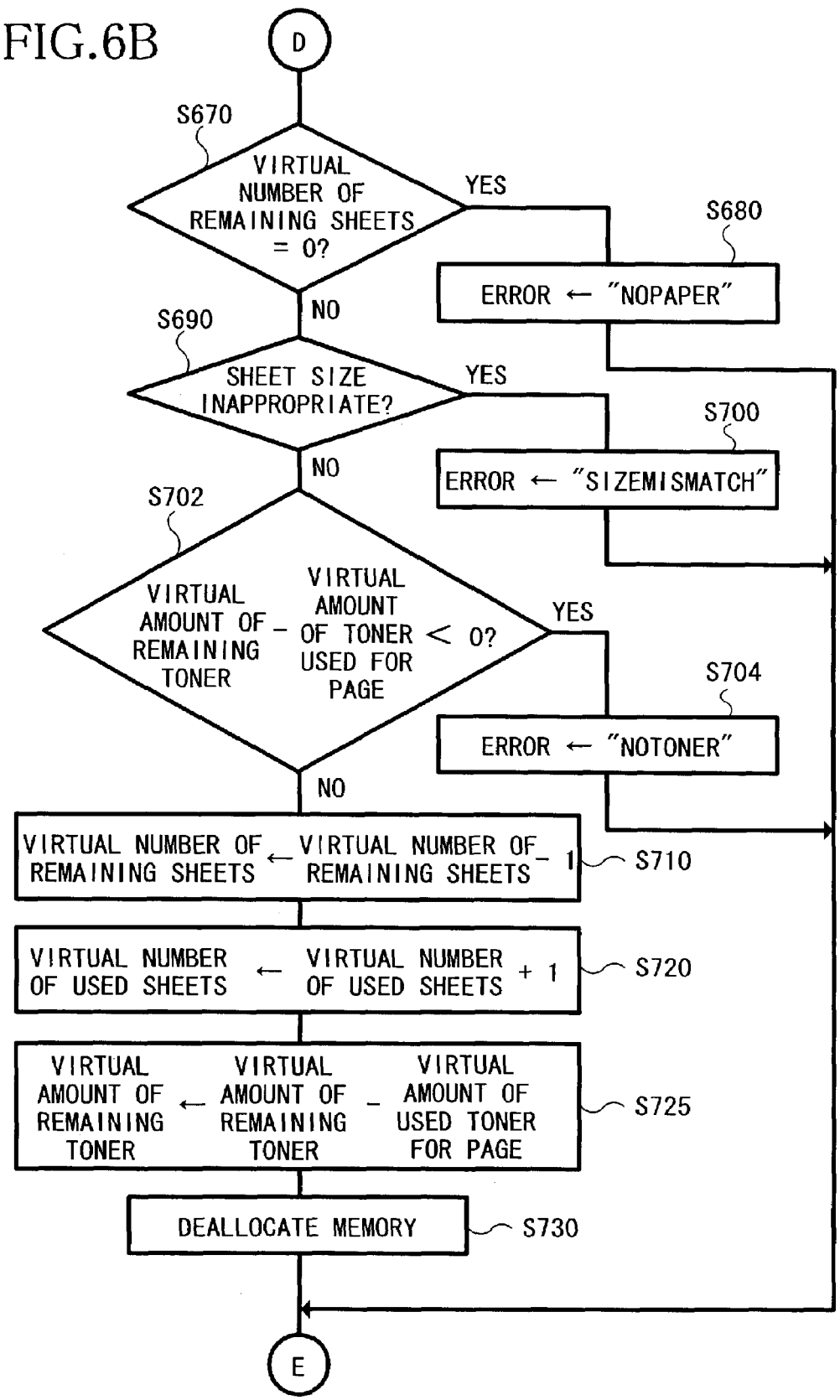
FIG. 6B is a continuation of FIG. 6A.

When the data is not a virtual printing end command (S400:NO), at S420, a virtual printing operation is performed. FIGS. 6A and 6B show detailed procedures of the virtual printing operation. At S600 of FIG. 6A, the print data in the receiving buffer 28*a* is analyzed. The print data is described, for example, by the page description language, and is analyzed in a manner similar to an analysis performed during a normal actual printing operation.

At S610, it is determined whether memory allocation is required, according to the analytical results of S600. When the memory allocation is required (S610:YES), memory allocation is performed to allocate an area for the memory 28*b* at S620. Then, at S630, it is determined whether the memory allocation ended in failure. When the memory allocation ended in failure (S630:YES), "MEMFULL" is set as error information at S640, and flow goes back to S430 of FIG. 4. When the memory allocation is successful (S630:NO), flow moves to S650.

When the memory allocation is not required (S610:NO), flow also moves to S650. At S650, image data is created based on the analytical results of the print data, and stored in the memory 28*b*. In this embodiment, the image data corresponds to a result of the interpretation of print data of the invention.

At S660, it is determined whether the printing operation needs to be performed based on the analytical results of the print data. When the printing operation is not required (S660:NO), flow moves to S430 of FIG. 4. When the printing operation is required (S660:YES), flow moves to S670 of FIG. 6B.

At S670, it is determined whether the virtual number of remaining sheets is 0. When the virtual number of remaining sheets is 0 (S670:YES), at S680, "NOPAPER" is set as error information. After that, flow moves to S430 of FIG. 4. When the virtual number of remaining sheets is not 0 (S670:NO), flow moves to S690.

At S690, it is determined whether the sheet size detected by the sheet size detection unit 24 matches with the sheet size identified as required by the analysis of the print data. When the detected sheet size does not match with the required sheet size (S690:YES), at S700, "SIZEMISMATCH" is set as error information, and flow moves to S430 of FIG. 4. When the detected sheet size matches the required sheet size (S690:NO), flow moves to S702.

At S702, it is determined whether subtracting the virtual amount of toner used for a page from the virtual amount of remaining toner becomes smaller than 0. That is, it is determined whether there is enough toner remaining to print a page of data. The amount of remaining toner is detected by the toner remaining amount detection unit 30. When the result of the subtraction becomes smaller than 0 (S702:YES), at S704, "NOTONER" is set as error information, and flow moves to S430 of FIG. 4. When the result of the subtraction becomes greater than or equal to 0 (S702:NO), flow moves to S710.

At S710, the virtual number of remaining sheets is decremented by one (−1). This step corresponds to a situation creating unit. At S720, the virtual number of used sheets is incremented by one (+1). At S725, the virtual amount of used toner for the page is subtracted from the virtual amount of remaining toner. Then, at S730, the memory allocated at S620 is deallocated. After that, flow goes back to S430 of FIG. 4.

Figure 4B:
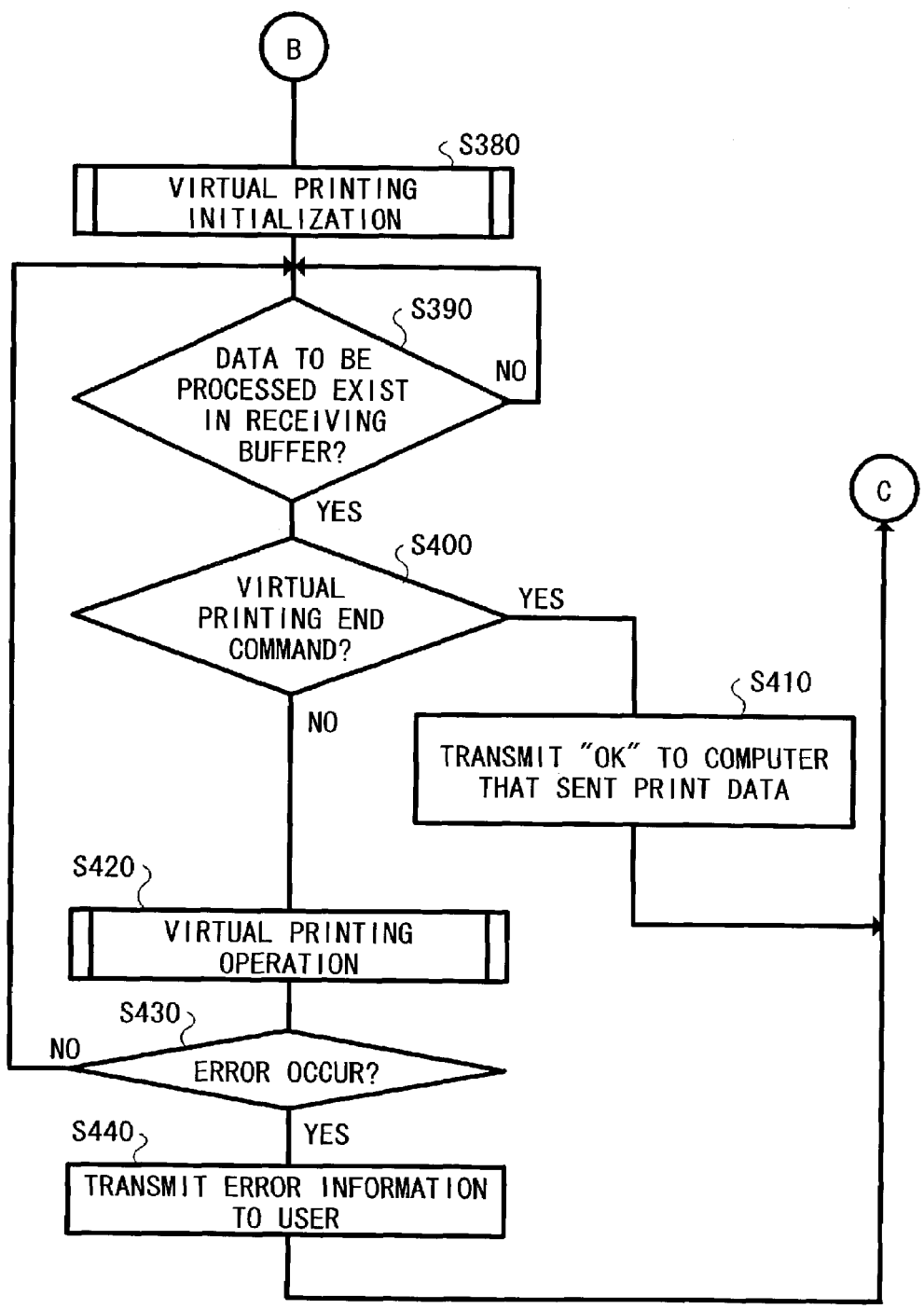
FIG. 4B is a continuation of the flowchart of FIG. 4A.
Figure 5:
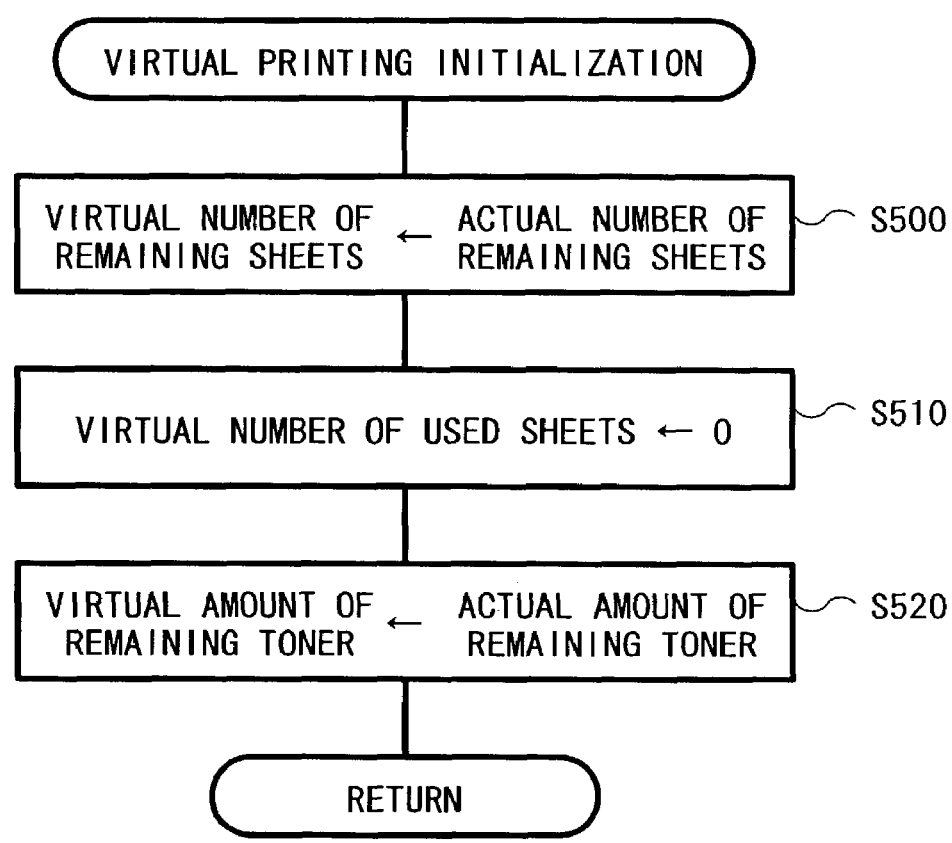
FIG. 5 is a flowchart showing detailed procedures of a virtual print initialization to be performed during the printing operation of FIG. 4A.

At S430 of FIG. 4, it is determined whether an error has occurred during the virtual printing operation at S420 with reference to the error information. When it is determined that an error has not occurred (S430:NO), flow goes back to S390 and the subsequent steps are performed. When it is determined that an error has occurred (S430:YES), flow moves to S440. At S440, in addition to the error information, which is set at the virtual printing operation of S420, a value, which is set as the virtual number of used sheets, is transmitted to the computer 10 that has sent the data. After that, flow goes back to S310. For example, when "MEMFULL" is set as error information because of a failure in the memory allocation (S630:YES) and the virtual number of used sheets is 10, as shown in FIG. 7A, "MEMFULL AT PAGE 10" is transmitted to the computer 10 as error information. In cases where "NOPAPER", "SIZEMISMATCH", or "NOTONER" is set as error information, likewise, error information is created and transmitted to the computer 10.

As described above, at the virtual printing operation of S420 (S600 to S730), the printing unit 26 is not driven as in an actual printing operation. That is, in the actual printing operation of S370, the procedures of S380 to S440 (including the steps shown in FIGS. 5 and 6) are actually performed. At S710, the number of remaining sheets detected by the sheet remaining amount detection unit 25 is set as the actual number of remaining sheets. Further, between S690 and S710, according to the image data stored in the memory 28b, the printing unit 26 is driven to convey sheets (for example, a sheet conveying motor, a laser emitting unit, a print head and an actuator are driven) and a developing agent, such as ink or toner, is adhered onto the sheets in monochrome or a plurality of colors. However, at the virtual printing operation, the printing unit 26 is not driven as described above. That is, the sheets used as the recording medium are not conveyed.

When the user instructs the printing operation via the application program, the dialog box, which shows a virtual print result whether the virtual printing operation has been normally completed, is displayed on the display unit 15 of the computer 10. Therefore, prior to the actual printing operation, the user can confirm whether the processing of the desired print data, other than the sheet conveying operation and the color applying operation, will be normally performed. In addition, the dialog box shows descriptions of the type error that occurred during the processing of the print data and/or a page number, at which an error occurred. Accordingly, the user can take measures against the problems prior to the actual printing operation with reference to the dialog box.

Especially, because of an error, such as a memory full error, that is difficult for the user to resolve when it occurs during the actual printing operation, is informed prior to the actual printing operation, the usability of the printer 20 can be improved. For example, as shown in FIG. 7B, when the user is informed of a memory full error via the dialog box, the user can cancel the actual printing operation by the printer 20 at this point by selecting the "cancel" button of the dialog box. Then, the user transmits the print data to another printer, which has an enough storage space, to print the data. By doing so, the memory full error will not occur. Even if the memory full error occurs at the virtual printing operation, the conveying mechanism is not driven during the virtual operation, so that sheets will not be wasted and it is economical. Accordingly, the print data can be printed by the another printer without wasting sheets.

In the above-described embodiment, while a printing operation is performed using print data from a given computer 10, a printing operation for other print data required by the application program is prohibited from performance in other computers 10, and the printer 20 does not receives data from other computers between the instant when the printer 20 receives the interrupt prohibition start command and the instant when the printer 20 receives the interrupt prohibition end command. By doing so, the function of prohibiting the printing operation is implemented as a print prohibition unit. However, the way of implementing this function is not limited to the embodiment. For example, when commands and/or print data are transmitted from the computer 10 to the printer 20 as shown in FIGS. 7A, 8A and 9, data, which uniquely identifies a client computer 10, and job specifying data, which shows a job number of the print data, are transmitted from the computer 10 to the printer 20. By doing so, after the printer 20 receives a virtual printing operation start command, the printer 20 prohibits receiving commands and print data, which include job specifying data that is not included in the virtual printing start command.

In this embodiment, as shown in FIG. 8B, the dialog box, which shows a message to the effect that the printing operation will be normally completed, pops up when normal printing is determined to be possible, so as to allow the user to select the "print" or "cancel" button. Thus, in both cases where the virtual printing operation has been normally completed or not, the user can choose to go forward with printing or canceling printing. However, it is not necessary for the dialog box to pop up in all cases. The actual printing operation may be performed without showing the dialog box when the virtual printing operation has been normally completed. That is, after the processing of S150 of FIG. 2, flow does not move to S180, but moves to S220. By doing so, the actual printing operation is performed without selecting the "print" button every time.

In this embodiment, at S 190 of FIG. 2, when the user selects the "print" button (S190:YES), print data is transmitted to the printer 20 from the HDD 12 again (S220 to S240 of FIG. 3) to perform the actual printing operation. If the printer 20 has an enough storage space, it is unnecessary to provide the print data to the printer 20 twice. That is, the print data, which is read from the HDD 12 of the computer 10 and transmitted to the printer 20 by the processing of S120, S130 and S160 of FIG. 2, is stored in the printer 20 and the actual printing operation is performed by using the print data stored in the printer 20. By doing so, it is essential only that instructions for performing the actual printing operation as to the print data, which has been used for the virtual printing operation, be provided from the computer 10 to the printer 20. Thus, there is no need to transmit the same data twice from the computer 10 to the printer 20.

In the embodiment, the processing of S160 corresponds to the processing performed by a print data transmitting unit. The processing of S 110 corresponds to the processing performed by a virtual print request transmitting unit. The processing of S150 and S170 correspond to the processing performed by a virtual print result receiving unit. The processing of S180 corresponds to the processing performed by a virtual print result informing unit. The processing of S190 corresponds to the processing performed by an instruction input unit. The processing of S420 corresponds to the processing performed by a virtual printing unit. The processing of S440 corresponds to the processing performed by a virtual print result transmitting unit.

At the virtual printing operation, at least the print data received by the print data receiving unit is interpreted and the result of the interpretation of the print data is stored in the storage unit. The virtual print result output unit outputs a virtual print result based on the determination whether the storing of the virtual print result has been satisfactorily completed. By doing so, it can be confirmed whether the storing of the virtual print result has been completed, before an actual printing operation is performed. For example, when an error will occur in process of the printing onto a recording medium during the actual printing operation because the interpretation of the print data ended in failure or the result of the interpretation of the print data overflows from the storage unit in the process of storing the result, an occurrence of the error during the actual printing operation can be predicted from the virtual print result.

When the result of interpretation of the print data is stored in the storage unit, a memory full error is outputted as the virtual print result if the print data overflows the storage unit. By doing so, the user learns from the result of the virtual printing operation that the memory full error will occur before the actual printing operation is performed. Therefore, a document having consistency in pages can be obtained and sheets can be saved.

The virtual print request transmitting unit transmits a virtual print request when instructed to send the virtual print request by the execution of an automatic print program. Alternatively, for example, the printing system includes a virtual printing start instruction input unit for inputting the instructions of the start of the virtual printing operation by the user into the printing system. The virtual print request transmitting unit transmits the virtual print request when the instruction of the start of the virtual printing operation is inputted by the virtual printing start instruction input unit. By doing so, the virtual printing operation can be performed by the printing system in accordance with the user's request.

The virtual print result output unit can also be designed to output the virtual print result to obtain the virtual print result by the processing of the automatic print program. With this structure, the occurrence of the error can be detected in the process of the automatic processing before the actual printing operation is performed. Alternatively, the virtual print result output unit can be designed so as to provide the virtual print result to the user. By doing so, the user can predict the possibility of the occurrence of the error before the actual printing operation.

In the printing system, the combination of the above-described units is predetermined and installed in appropriate devices. Further, one unit can be implemented in a plurality of devices.

The printing system of the invention includes a print data transmitting device and a printing apparatus. The print data transmitting device includes a print data transmitting unit, a virtual print request transmitting unit, a virtual print result receiving unit that includes a virtual print result output unit, and a virtual print result informing unit. The printing apparatus includes a print data receiving device, a color applying unit, an actual printing unit, a virtual print request receiving unit, a virtual printing unit and a virtual print result transmitting unit that includes a virtual print result output unit.

The printing system can have another structure. For example, when the virtual print result output unit informs the user of the virtual print result, a print data transmitting unit is provided in the server, and a virtual print result receiving unit and a virtual print result informing unit are provided in the user terminal connected with the server. The print data transmitting unit can be provided in the server and the virtual print request transmitting unit can be provided in the user terminal.

When the virtual print result output unit outputs the virtual print result, instructions as to whether an actual printing operation is performed are inputted by the instruction input unit. The actual printing operation is performed when the instruction to perform the actual printing operation is inputted. By doing so, the user can instruct the implementation of the actual printing operation after becoming acquainted with the virtual print result. The actual printing operation is not performed when the instruction not to perform the actual printing operation is inputted.

When the virtual printing operation by the virtual printing unit has been normally completed, the actual printing operation is performed in accordance with the print data used at the virtual printing operation, following the virtual printing operation. By doing so, the actual printing operation can be performed immediately after the virtual printing operation.

The system can be designed such that when the virtual printing operation by the virtual printing unit has not been normally completed, the user is informed of the virtual print result, and, when the virtual printing operation has been normally completed, the actual printing operation is performed in accordance with the print data without informing the user of the virtual print result. Alternatively, the system can be designed such that the user is informed of the virtual print result regardless of whether the virtual printing operation has been normally completed before the actual printing operation is performed, and then the actual printing operation is performed in accordance with the print data used during the virtual printing operation when the virtual printing operation has been normally completed. The above-described structure saves the user from having to input instructions to start the actual printing operation. The print data to be used at the actual printing operation may be transmitted again by the print data transmitting unit.

If an actual printing operation is performed in accordance with other print data, which is different from the print data used at the virtual printing operation, after the virtual print result of a normal completion of the virtual printing operation is outputted, the actual printing operation may not be normally performed. It is assumed that a virtual print result of normal completion of a virtual printing operation is outputted when there are ten sheets of paper left after the virtual printing operation that the print data includes data for ten pages or less. However, if the actual printing operation is performed based on another print data and, thus, some of the sheets are used after the virtual print result is outputted, the sheets will run out during the actual printing operation even though it was determined during the virtual printing operation the print data was normally printed. In order to avoid the above-described case, the system is designed such that a virtual printing operation and an actual printing operation of print data, which is not the same as the print data used at the virtual printing operation, are prohibited to be performed between the instance when the virtual printing operation of the print data by the virtual printing unit is started and the instance when a predetermined prohibition release condition is established. With this structure, until the predetermined prohibition release condition is established, the condition of the printing system will not be changed. Conversely, the system can be designed such that the predetermined release condition is established when there is no problem even though the current condition is changed by the other print data.

The system can be designed such that the release condition is established when the actual printing operation of data, which is the same as the print data whose virtual printing operation has been completed by the virtual printing unit, is completed by the actual printing unit. That is, virtual and actual printing operations using the other print data are allowed to be performed when the virtual printing operation using the print data used at the virtual printing operation is completed.

During the virtual printing operation, the sheet conveying mechanism is not driven although the print data processing is performed. Therefore, if the current condition will be changed in accordance with the driving of the sheet conveying mechanism, a situation creating unit creates a situation, which is supposed to occur if the conveying mechanism is driven. Accordingly, there is no difference between the processing performed at the virtual printing operation and the processing performed at the actual printing operation. For example, in the printing apparatus that performs the actual printing operation by detecting the number of remaining sheets, the number of remaining sheets to be detected by the sensor decreases every time a single sheet is conveyed from the stack by the sheet conveying mechanism at the actual printing operation. However, at the virtual printing operation, the number of remaining sheets to be detected by the sensor is not actually changed because the sheet conveying mechanism is not driven. Instead of detecting the number of remaining sheets by the sensor, the situation creating unit creates the above situation and decrements a variable value, which indicates the current number of remaining sheets, every time the virtual printing unit performs a printing operation of a page. Then, a virtual print result is obtained based on the variable value as to whether the sheet empty error has occurred. As described above, because the situation, which is supposed to occur if the conveying mechanism is driven, is created, differences in the situations, such as data and timings, between the virtual printing operation and the actual printing operation can be eliminated.

The actual printing prohibition unit and the situation creating unit are preferably provided in the printing apparatus. The instruction input unit is preferably provided in the print data transmitting device.

The computer program for implementing the printing system can be stored in a computer-readable recording medium, such as a floppy disk, magnetic-optical disc, CD-ROM, hard disk, ROM or RAM. The program can be loaded from the recording medium into a computer system and run as necessary. Further, the computer program is not necessarily stored in the recording medium, but can be loaded into the computer system via a network.

Further, although the invention has been described as identifying two specific errors during virtual printing, other errors that can be predicted based on projected printing can also be generated by the situation creating unit. As an example, when the printer is equipped with a sensor that measures developing agent (ink or toner) usage, or a routine to predict developing agent empty, an error message can be generated during virtual printing indicating the developing agent will run out during actual printing and identifying the page such would occur.

Although the invention has been described in detail and with reference to a specific embodiment thereof, it will be apparent to those skilled in the art that various changes, arrangements and modifications may be applied therein without departing from the spirit and scope of the invention.

What is claimed is:

1. A printing system, comprising:
   a print data transmitting unit that transmits print data;
   a print data receiving unit that receives the print data transmitted from the print data transmitting unit;
   a color applying unit that adheres a developing agent onto a recording medium in monochrome or a plurality of colors;
   an actual printing unit that performs an actual printing operation by at least interpreting the print data received by the print data receiving unit, conveying the recording medium by driving a conveying mechanism, providing a result of the interpretation of the print data to the color applying unit, and adhering developing agent onto the conveyed recording medium;
   a virtual print request transmitting unit that transmits a virtual print request for implementation of a virtual printing operation which simulates each step of the actual printing operation but does not convey the recording medium by driving the conveying mechanism or adhere developing agent onto the conveyed recording medium;
   a virtual print request receiving unit that receives the virtual print request transmitted from the virtual print request transmitting unit;
   a virtual printing unit that performs the virtual printing operation in accordance with the print data received by the print data receiving unit when the virtual print request receiving unit receives the virtual print request; and
   a virtual print result output unit that outputs a virtual print result which shows a result whether the virtual printing operation of the print data received by the print data receiving unit has been normally completed.

2. The printing system according to claim 1, further comprising a storage unit, wherein the virtual printing operation is a process to at least interpret the print data received by the print data receiving unit and to store a result of the interpretation of the print data in the storage unit, and the virtual print result output unit outputs the virtual print result in accordance with the completion or noncompletion of the storage of the result into the storage unit.

3. The printing system according to claim 2, further comprising:
   a print data transmitting device that includes the print data transmitting unit and the virtual print request transmitting unit; and
   a printing apparatus that includes the print data receiving unit, the color applying unit, the actual printing unit, the virtual print request receiving unit and the virtual printing unit, wherein the virtual print result output unit includes a virtual print result transmitting unit that transmits the virtual print result, a virtual print result receiving unit that receives the virtual print result transmitted from the virtual print result transmitting unit, and a virtual print result informing unit that informs the virtual print result received by the virtual print result receiving unit, and the print data transmitting unit further includes the virtual print result receiving unit and the virtual print result informing unit, and the printing apparatus further includes the virtual print result transmitting unit.

4. The printing system according to claim 2, further comprising an instruction input unit that is used to input instructions whether the actual printing operation of the print data, whose virtual printing operation has been performed, is performed when the virtual print result is outputted by the virtual print result output unit, wherein the actual printing unit performs the actual printing operation when the instruction to perform the actual printing operation is inputted by the instruction input unit.

5. The printing system according to claim 2, wherein the actual printing unit performs the actual printing operation, following the virtual printing operation, based on the print data used at the virtual printing operation, when the virtual printing operation is normally completed by the virtual printing unit.

6. The printing system according to claim 2, further comprising a print prohibition unit that prohibits the virtual and actual printing operations of other print data between the instance when the virtual printing operation of the print data is started by the virtual printing unit and the instance when a predetermined release condition is established.

7. The printing system according to claim 6, wherein the predetermined release condition is established when the actual printing operation of the print data, which is the same as the print data used at the virtual printing operation by the virtual printing unit, is completed by the actual printing unit.

8. The printing system according to claim 2, wherein the virtual printing unit includes a situation creating unit that create a situation, which would occur if the conveying mechanism were actually driven during the virtual printing operation.

9. The printing system according to claim 1, further comprising an instruction input unit that is used to input instructions whether the actual printing operation of the print data, whose virtual printing operation has been performed, is performed when the virtual print result is outputted by the virtual print result output unit, wherein the actual printing unit performs the actual printing operation when the instruction to perform the actual printing operation is inputted by the instruction input unit.

10. The printing system according to claim 1, wherein the actual printing unit performs the actual printing operation, following the virtual printing operation, based on the print data used at the virtual printing operation, when the virtual printing operation is normally completed by the virtual printing unit.

11. The printing system according to claim 1, further comprising a print prohibition unit that prohibits the virtual and actual printing operations of other print data between the instance when the virtual printing operation of the print data is started by the virtual printing unit and the instance when a predetermined release condition is established.

12. The printing system according to claim 11, wherein the predetermined release condition is established when the actual printing operation of the print data, which is the same as the print data used at the virtual printing operation by the virtual printing unit, is completed by the actual printing unit.

13. The printing system according to claim 1, wherein the virtual printing unit includes a situation creating unit that create a situation, which would occur if the conveying mechanism were actually driven, during the virtual printing operation.

14. A printing apparatus, comprising:
a print data receiving unit that receives print data;
a color applying unit that adheres a developing agent onto a recording medium in monochrome or a plurality of colors;
an actual printing unit that performs an actual printing operation by at least interpreting the print data received by the print data receiving unit, conveying the recording medium by driving a conveying mechanism, providing a result of the interpretation of the print data to the color applying unit, and adhering the developing agent onto the conveyed recording medium;
a virtual print request receiving unit that receives a virtual print request for implementation of a virtual printing operation and, based on the print data received by the print data receiving unit, simulates each step of the actual printing operation but does not convey the recording medium by driving the conveying mechanism or adhere developing agent onto the conveyed recording medium;
a virtual printing unit that performs the virtual printing operation in accordance with the print data received by the print data receiving unit when the virtual print request receiving unit receives the virtual print request; and
a virtual print result output unit that outputs a virtual print result which shows a result whether the virtual printing operation of the print data received by the print data receiving unit has been normally completed.

15. A print data transmitting device, comprising:
a print data transmitting unit that transmits print data to a printing apparatus that performs an actual printing operation onto a recording medium by driving a conveying mechanism and adhering a developing agent onto the conveyed recording medium;
a virtual print request transmitting unit that transmits a virtual print request to the printing apparatus to implement a virtual printing operation, at which each step of the actual printing operation is simulated without conveying the recording medium by the conveying mechanism or adhering the developing agent onto the conveyed recording medium;
a virtual print result receiving unit that receives from the printing apparatus the virtual print result showing a result whether the virtual printing operation of the print data has been normally completed; and
a virtual print result informing unit that informs the virtual print result received by the virtual print result receiving unit.

16. A computer program stored on a computer recording medium and executable by a printing system, the computer program comprising:
instructions for transmitting print data;
instructions for receiving the print data;
instructions for applying a developing agent onto a recording medium in monochrome or a plurality of colors;
instructions for performing an actual printing operation by at least interpreting the print data received by the print data receiving unit, conveying the recording medium by driving a conveying mechanism, providing a result of the interpretation of the print data to the color applying unit, and adhering the developing agent onto the conveyed recording medium;
instructions for transmitting a virtual print request to perform a virtual printing operation which simulates each step of the actual printing operation without conveying the recording medium by driving the conveying mechanism or adhering the developing agent onto the conveyed recording medium;
instructions for receiving the virtual print request;
instructions for performing the virtual printing operation in accordance with the print data when the receiving the virtual print request; and
instructions for outputting a virtual print result, which shows a result whether the virtual printing operation of the received print data has been normally completed.

17. A computer program stored on a computer recording medium and executable by a printing apparatus, the computer program comprising:
instructions for receiving print data;
instructions for applying a developing agent onto a recording medium in monochrome or a plurality of colors;
instructions for performing an actual printing operation, in which the developing agent is adhered onto the recording medium, by at least interpreting the print data received by the print data receiving unit, conveying the recording medium by driving a conveying mechanism, providing a result of the interpretation of the print data to the color applying unit, and adhering the developing agent onto the conveyed recording medium;

instructions for receiving a virtual print request to perform a virtual printing operation which, based on the received print data, simulates each step of the actual printing operation but does not convey the recording medium by driving the conveying mechanism or adhere the developing agent onto the conveyed recording medium;

instructions for performing the virtual printing operation in accordance with the received print data when receiving the virtual print request; and instructions for outputting a virtual print result which shows a result whether the virtual printing operation of the received print data has been normally completed.

18. A computer program stored on a computer recording medium and executable by a print data transmitting device, the computer program comprising:

instructions for transmitting print data to a printing apparatus that performs an actual printing operation onto a recording medium by driving a conveying mechanism and adhering a developing agent onto the conveyed recording medium;

instructions for transmitting a virtual print request to the printing apparatus to implement a virtual printing operation, at which each step of the actual printing operation is simulated without conveying the recording medium by the conveying mechanism or adhering the developing agent onto the conveyed recording medium;

instructions for receiving from the printing apparatus the virtual print result showing a result whether the virtual printing operation of the print has been normally completed; and instructions for informing the received virtual print result.

19. A method of printing in a system having a data production component and a printing component, comprising:

preparing data for printing in the data production component;

instructing the printing;

determining whether the printing is actual printing or virtual printing;

transferring data to the printing component; and executing the determined printing;

wherein when the printing is virtual, the printing component:

simulates each step of the actual printing operation in order to determine an availability of memory to process the transferred data for printing, an availability of sufficient recording medium for printing the transferred data, and an availability of sufficient developing agent for the transferred data, but during the virtual printing operation, a recording medium is not conveyed by driving the conveying mechanism and a developing agent is not adhered onto the recording medium,; and sends an error message to the data production component when an insufficiency occurs.

20. The method according to claim 19, wherein the transferred data can be used with at least one of the virtual printing and both the virtual printing and the actual printing.

21. The method according to claim 19, wherein the data production component has a display device, the method further comprising:

displaying one of the error message and an actual printing O.K. message on the display and an option to initiate the actual printing.

22. The method according to claim 21, further comprising one of canceling or initiating actual printing.

23. The method according to claim 19, wherein determining the availability of recording medium further comprises determining a number of sheets of recording medium remaining, allocating the transferred data to virtual sheets, and identifying whether there are sufficient sheets to print all of the transferred data.

24. The method according to claim 22, wherein when there is more transferred print data than can be printed on the available recording medium, identifying a last page of the transferred data that can be printed.

25. The method according to claim 19, wherein the printing component has at least one sensor to determine a status of the developing agent.

26. The method according to claim 25, wherein when there is more transferred print data than can be printed by the developing agent, identifying a last page of the transferred data that can be printed.

* * * * *